(12) United States Patent
You et al.

(10) Patent No.: US 12,388,350 B2
(45) Date of Patent: Aug. 12, 2025

(54) DYNAMIC TOTAL CURRENT CONTROL FOR A VOLTAGE REGULATOR

(71) Applicant: Infineon Technologies Austria AG, Villach (AT)

(72) Inventors: Zhiqing You, Torrance, CA (US); Tim Ng, Monterey Park, CA (US); Venkat Sreenivas, Winchester, MA (US)

(73) Assignee: Infineon Technologies Austria AG, Villach (AT)

( * ) Notice: Subject to any disclaimer, the term of this patent is extended or adjusted under 35 U.S.C. 154(b) by 230 days.

(21) Appl. No.: 18/350,224

(22) Filed: Jul. 11, 2023

(65) Prior Publication Data
US 2025/0023450 A1 Jan. 16, 2025

(51) Int. Cl.
*H02M 1/00* (2007.01)
*H02M 1/08* (2006.01)

(52) U.S. Cl.
CPC ......... *H02M 1/082* (2013.01); *H02M 1/0009* (2021.05); *H02M 1/0025* (2021.05)

(58) Field of Classification Search
CPC .. H02M 1/082; H02M 1/0009; H02M 1/0025; H02M 1/32
See application file for complete search history.

(56) References Cited

U.S. PATENT DOCUMENTS

| | | | | |
|---|---|---|---|---|
| 9,785,214 | B2 * | 10/2017 | Wood, III | H02M 3/28 |
| 2003/0185025 | A1 | 10/2003 | Takemura et al. | |
| 2009/0327786 | A1 | 12/2009 | Carroll et al. | |
| 2014/0119059 | A1 * | 5/2014 | Mao | H02M 3/33507 363/16 |
| 2019/0386481 | A1 | 12/2019 | Cho et al. | |
| 2021/0028685 | A1 * | 1/2021 | Shao | H02M 1/088 |
| 2021/0294369 | A1 | 9/2021 | Koski et al. | |

OTHER PUBLICATIONS

Extended European Search Report for European Application No. EP241879626 dated Dec. 18, 2024, 14 pages.
"OptiMOS Powerstage TDA21590," Infineon Technologies AG, Aug. 2, 2021, München, Germany, 22 pages.

* cited by examiner

*Primary Examiner* — Adolf D Berhane
*Assistant Examiner* — Afework S Demisse
(74) *Attorney, Agent, or Firm* — Harrity & Harrity, LLP

(57) ABSTRACT

A multi-phase controller includes a summer circuit configured to sense a plurality of phase currents generated by a plurality of power stages and generate a summed current value representative of a total current generated by the plurality of power stages; and a current limit controller configurable in a current-limit mode or a non-current-limit mode based on the summed current value and configured to limit the total current to a predefined value during the current-limit mode. The current limit controller includes a threshold selector circuit and a mode configuration circuit. The threshold selector circuit selects a first threshold or a second threshold as a selected threshold based on a configuration signal. The mode configuration circuit monitors a duration during which a comparison result indicates that the summed current value satisfies the selected threshold, and generates the configuration signal based on whether the first duration satisfies a duration threshold.

21 Claims, 2 Drawing Sheets

DYNAMIC TOTAL CURRENT CONTROL FOR A VOLTAGE REGULATOR

BACKGROUND

A voltage regulator is an electronic device or circuit that maintains a stable output voltage regardless of changes in input voltage or load conditions. Its primary function is to regulate or control the voltage level to a specific value within a desired range. Voltage regulators are commonly used in electronic systems to ensure that sensitive components receive a consistent and reliable power supply. They are found in various applications, including power supplies, battery chargers, computer systems, automotive electronics, and many other devices. A voltage regulator may operate by comparing an output voltage with a reference voltage and adjusting its internal components to maintain a constant output voltage. When the input voltage or load changes, the regulator automatically adjusts its output to compensate for these variations.

In certain applications, such as in power distribution systems or three-phase systems, voltage regulators can be used in conjunction with other components, such as transformers, power stages, or power electronics, to control a phase current. These systems may involve regulating the voltage supplied to loads in order to maintain a specific current level or power factor. In such cases, additional components or control systems may be used to monitor and adjust the phase current based on the voltage regulation provided by the voltage regulator. The voltage regulator's role in this scenario may be to maintain a stable voltage supply, which indirectly affects the phase current through load characteristics and the overall system design.

SUMMARY

In some implementations, a voltage regulator includes a plurality of power stages configured to generate a plurality of phase currents, wherein a sum of the plurality of phase currents represents a total current, and wherein each power stage of the plurality of power stages is configured to generate a respective phase current of the plurality of phase currents; a summer circuit configured to sense the plurality of phase currents and generate a summed current value representative of the total current generated by the plurality of power stages; and a current limit controller configurable in a current limit mode or a non-current-limit mode and configured to limit the total current to a predefined value during the current-limit mode, wherein the current limit controller is configured to receive the summed current value, and wherein the current limit controller comprises: a threshold selector circuit configured to select a first threshold or a second threshold as a selected threshold based on a configuration signal, wherein the second threshold is less than the first threshold, wherein, while the current limit controller is set in the non-current-limit mode, the threshold selector circuit is configured to select the first threshold as the selected threshold, and wherein, while the current limit controller is set in the current-limit mode, the threshold selector circuit is configured to select the second threshold as the selected threshold; and a first monitoring path comprising: a first comparator circuit configured with a dynamic threshold that is set to the selected threshold, wherein the first comparator circuit is configured to compare the summed current value to the selected threshold and generate a first comparison result that indicates whether the summed current value satisfies the selected threshold; and a mode configuration circuit configured to monitor a first duration during which the first comparison result indicates that the summed current value satisfies the selected threshold, and generate the configuration signal based on whether the first duration satisfies a duration threshold.

In some implementations, a multi-phase controller includes a summer circuit configured to sense a plurality of phase currents generated by a plurality of power stages and generate a summed current value representative of a total current generated by the plurality of power stages; and a current limit controller configurable in a current-limit mode or a non-current-limit mode and configured to limit the total current to a predefined value during the current-limit mode, wherein the current limit controller is configured to receive the summed current value, and wherein the current limit controller comprises: a threshold selector circuit configured to select a first threshold or a second threshold as a selected threshold based on a configuration signal, wherein the second threshold is less than the first threshold, wherein, while the current limit controller is set in the non-current-limit mode, the threshold selector circuit is configured to select the first threshold as the selected threshold, and wherein, while the current limit controller is set in the current-limit mode, the threshold selector circuit is configured to select the second threshold as the selected threshold; and a first monitoring path comprising: a first comparator circuit configured with a dynamic threshold that is set to the selected threshold, wherein the first comparator circuit is configured to compare the summed current value to the selected threshold and generate a first comparison result that indicates whether the summed current value satisfies the selected threshold; and a mode configuration circuit configured to monitor a first duration during which the first comparison result indicates that the summed current value satisfies the selected threshold, and generate the configuration signal based on whether the first duration satisfies a duration threshold.

In some implementations, a method of limiting a total phase current generated a plurality of power stages includes sensing a plurality of phase currents generated by the plurality of power stages; generating a summed current value representative of the total phase current of the plurality of phase currents; configuring a current limit controller in a current-limit mode or a non-current-limit mode, wherein the current limit controller is configured to limit the total phase current to a predefined value during the current-limit mode; selecting a first threshold or a second threshold as a selected threshold based on a configuration signal, wherein the second threshold is less than the first threshold, wherein, while the current limit controller is set in the non-current-limit mode, the first threshold is used as the selected threshold, and wherein, while the current limit controller is set in the current-limit mode, the second threshold is used as the selected threshold; comparing the summed current value to the selected threshold; generating a first comparison result that indicates whether the summed current value satisfies the selected threshold; monitoring a first duration during which the first comparison result indicates that the summed current value satisfies the selected threshold; and generating the configuration signal based on whether the first duration satisfies a duration threshold.

BRIEF DESCRIPTION OF THE DRAWINGS

Implementations are described herein making reference to the appended drawings.

DETAILED DESCRIPTION

Figure 1:
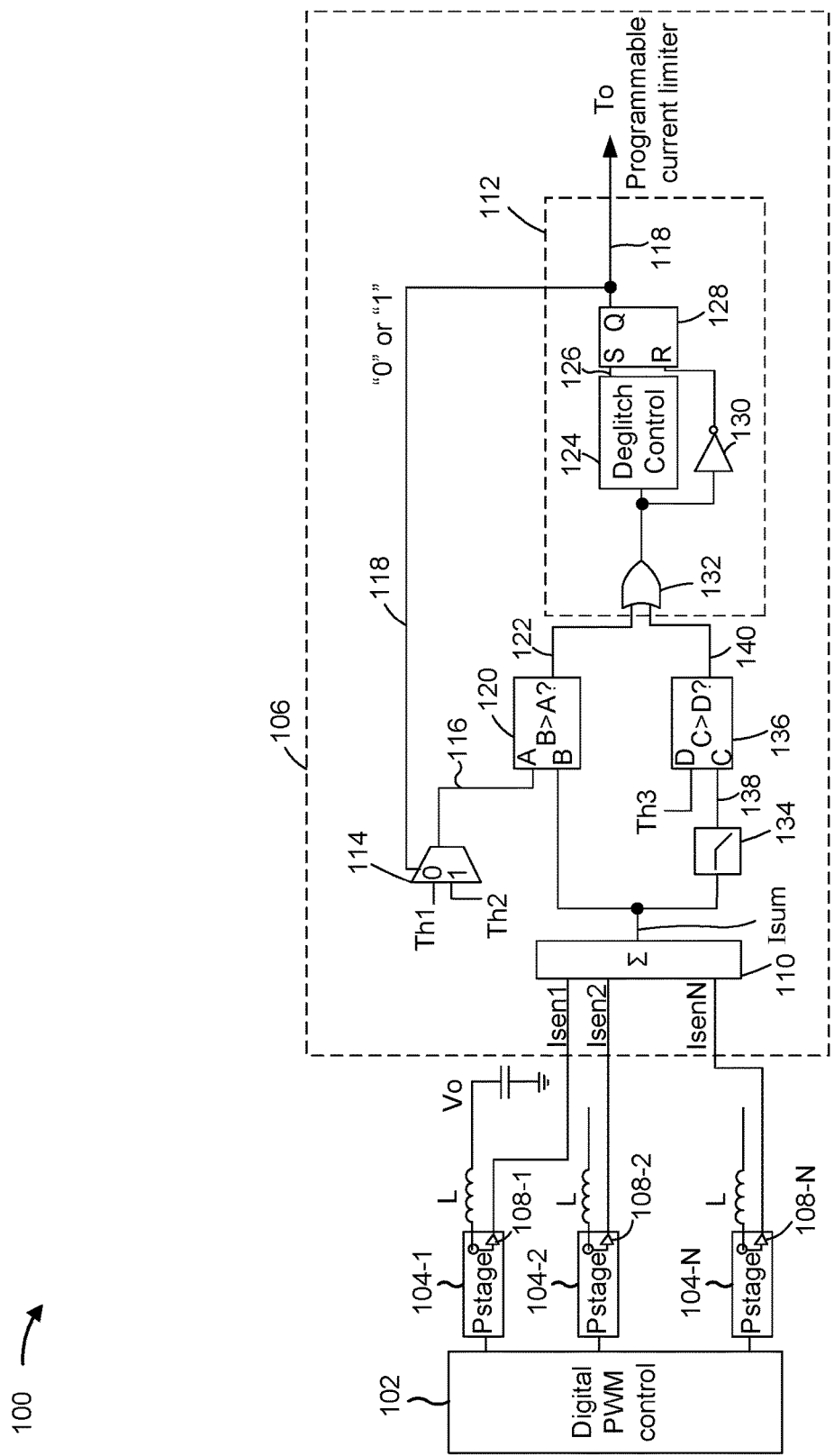
FIG. 1 shows a voltage regulator according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A voltage regulator may include a multi-phase controller and a plurality of power stages that are controlled by the multi-phase controller. The plurality of power stages may form a multi-phase buck converter with each power stage providing a respective output voltage and a respective phase current. Power stages (e.g., pulse-width modulation (PWM) power stages) may act similarly to power transformers. Thus, the multi-phase controller may be a digital PWM controller and a power stage may be a power converter that transforms input power to an output power that is applied to a load. In some cases, a power stage may be referred to as a step-down DC-DC converter or a buck converter.

In some implementations, two or more respective output voltages from respective power stages may be used (e.g., in combination) to provide a total output voltage that is provided by the multi-phase buck converter to a load, such as a central processing unit (CPU). The multi-phase buck converter may be configured with a plurality of synchronous-rectified channels arranged in parallel, with each channel including a respective power stage that provides a respective output voltage and a respective phase current. In some cases, two or more respective output voltages of a first group of power stages may be used to provide a first total output voltage and a first total current to a first load, and two or more respective output voltages of a second group of power stages may be used to provide a second total output voltage and a second total current to a second load.

The phase currents should be measured at the output of the power stages to determine a total current being generated by the multi-phase buck converter. For example, a CPU load current increase may be caused by normal CPU high speed activities in turbo mode or by abnormal activities caused, for example, by a virus, which typically last for a longer duration as compared to a typical duration of a load current increase resultant from normal CPU high speed activity. High load currents that last for extended durations may cause additional stress on an input supply (e.g., a 12V input supply) and should be avoided. However, if the multi-phase controller, that drives the power stages to deliver the power to the CPU, limits the total current based solely on a load current amplitude in order to prevent the CPU from drawing high load current induced by a virus, then load currents drawn during normal CPU activities, including turbo mode, will be affected too. As a result, the CPU may underperform during performance of normal CPU activities.

Some implementations disclosed herein are directed to a voltage regulator that provides a first path and a second path to limit the total current. The two paths may be implemented in a current limit controller as part of the multi-phase controller. The current limit controller may dynamically switch from the first path to the second path depending on a load current amplitude of the total current and a time duration at which the load current amplitude remains above one or more thresholds.

The first path may limit a spike current of the total current. For example, once the spike load current is higher than a spike over-current protection (OCP) threshold for a certain amount of time (e.g., a duration threshold), the current limit controller is configured to limit a target current to the total current to a lower threshold.

The second path may limit a DC load current. In this case, the current limit controller may clamp or limit the target current to the lower threshold when the total current, having been passed through a low-pass filter, exceeds the lower threshold for a certain amount of time (e.g., the duration threshold). Thus, the current limit controller not only takes into account load current amplitude of the total current, but also takes into account an amount of time that the load current amplitude of the total current exceeds a certain threshold. Thus, the current limit controller is capable of, at least to some degree, distinguishing between normal CPU high speed activities and abnormal activities that occur for longer durations before limiting the total current supplied to the CPU. As a result, instances of underperformance by the CPU caused by limiting the total current supplied during normal CPU high speed activities can be reduced or prevented.

FIG. 1 shows a voltage regulator 100 according to one or more implementations. The voltage regulator 100 includes a multi-phase controller 102 (e.g., a digital PWM controller) and a plurality of power stages 104-1, 104-2, . . . , 104-N, collectively referred to as power stages 104, where N is an integer representative of a total number of power stages. In some implementations, each power stage 104 may be a current synchronous buck gate-driver integrated circuit (IC).

The multi-phase controller 102 may generate a plurality of PWM control signals for controlling the power stages 104. For example, each PWM control signal may be provided to a respective power stage 104 for controlling a phase current and an output voltage Vo provided by the respective power stage 104. The phase currents may be limited via the PWM control signals. Each power stage 104 may be coupled to a respective inductor L through which a phase current of the power stage 104 flows. Thus, each phase current may also be referred to as a phase inductor current. Accordingly, the power stages 104 are configured to generate a plurality of phase currents, with each power stage configured to generate a respective phase current of the plurality of phase currents. A sum of the plurality of phase currents represents a total current provided by the power stages 104. The phase currents and output voltages Vo of the power stages 104 may be supplied to a single load, such as a single CPU, or may be distributed among multiple loads, such as multiple CPUs.

The voltage regulator 100 further includes a current limit controller 106. In some implementations, the current limit controller 106 may be integrated in the multi-phase controller 102 as feedback control for limiting the total current. The voltage regulator 100 may include a summer circuit (e.g., a sense circuit) that is configured to sense the plurality of phase currents and generate a summed current value Isum representative of the total current generated by the plurality of power stages. In some implementations, the summer circuit may include a sense circuit 108-1, 108-2, . . . , 108-N (collectively referred to as sense circuits 108) for each power stage 104. For example, each sense circuit 108 may include a probe and an analog-to-digital converter (ADC) coupled to an output of a respective power stage 104. Each ADC may be configured to generate a digital representation of an instantaneous phase current of a respective power stage 104. In other words, each ADC may generate a sensed current value Isen1, Isen2, . . . , or IsenN that is representative of the instantaneous phase current of the power stage 104 to which the ADC is coupled. In some implementations, the sensed current values Isen1, Isen2, . . . or IsenN may be analog representations of the instantaneous phase currents. Thus, the sense circuits 108 may be analog circuits or digital circuits.

In addition, the summer circuit may include a summer 110 that is configured to receive the sensed current values Isen1, Isen2, . . . , or IsenN from the sense circuits 108, and sum the sensed current values Isen1, Isen2, . . . , or IsenN to generate the summed current value Isum representative of the total current. Thus, the summed current value Isum is representative of an instantaneous amount of total current being generated by the plurality of power stages 104. In some implementations, the summer circuit may be integrated as part of the current limit controller 106. For example, the summer 110 may be integrated on a same chip as the current limit controller 106.

The current limit controller 106 is configurable in a current-limit mode or a non-current-limit mode, and the current limit controller 106 is configured to limit the total current to a predefined value (e.g., a limited target value) during the current-limit mode. The current limit controller 106 is configured to receive the summed current value Isum and determine which mode to be configured in based on two monitoring paths, which are used to evaluate the summed current value Isum. The two monitoring paths include a first monitoring path P1 and a second monitoring path P2. The first monitoring path P1 and the second monitoring path P2 may share a mode configuration circuit 112.

The current limit controller 106 includes a threshold selector circuit 114 configured to select a first threshold Th1 or a second threshold Th2 as a selected threshold 116 based on a configuration signal 118. The second threshold Th2 is less than the first threshold Th1. The threshold selector circuit 114 may be a multiplexer that includes two inputs and one output. The first threshold Th1 and the second threshold Th2 may be provided to the two inputs, respectively, and the threshold selector circuit 114 may selectively output one of the two thresholds Th1 or Th2 based on the configuration signal 118. For example, the configuration signal 118 may be a logic "0" value when the current limit controller 106 is configured in the non-current-limit mode and the configuration signal 118 may be a logic "1" value when the current limit controller 106 is configured in the current-limit mode. The threshold selector circuit 114 may output the first threshold Th1 when the configuration signal 118 is at the logic "0" value and the threshold selector circuit 114 may output the second threshold Th2 when the configuration signal 118 is at the logic "1" value.

Thus, while the current limit controller 106 is set in the non-current-limit mode, the threshold selector circuit 114 is configured to select the first threshold Th2 as the selected threshold 116, and, while the current limit controller 106 is set in the current-limit mode, the threshold selector circuit 114 is configured to select the second threshold Th2 as the selected threshold 116.

The first monitoring path P1 includes a first comparator circuit 120 (e.g., a first comparator) configured with a dynamic threshold that is set to the selected threshold 116. In other words, the first comparator circuit 120 is configured to use the selected threshold 116 (e.g., either the first threshold Th1 or the second threshold Th2) selected by the threshold selector circuit 114 as a threshold used for performing a comparison. Thus, the threshold used for performing the comparison changes dynamically based on the configuration signal 118 that controls the output of the threshold selector circuit 114. The first comparator circuit 120 includes two inputs, inputs A and B, and compares the signals received at the two inputs to generate a first comparison result 122. Input A may be configured to receive the selected threshold 116 and input B may be configured to receive the summed current value Isum. The first comparator circuit 120 may be configured to compare the summed current value Isum to the selected threshold 116 and generate the first comparison result 122 that indicates whether the summed current value Isum satisfies the selected threshold 116. For example, the first comparison result 122 may indicate whether or not the summed current value Isum is greater than the selected threshold 116. For example, the first comparator circuit 120 may set the first comparison result 122 to a logic "1" value when the summed current value Isum is greater than the selected threshold 116 (e.g., when the summed current value Isum satisfies the selected threshold 116) and the first comparator circuit 120 may set the first comparison result 122 to a logic "0" value when the summed current value Isum is not greater than the selected threshold 116 (e.g., when the summed current value Isum does not satisfy the selected threshold 116).

The mode configuration circuit 112 may be configured to monitor a first duration during which the first comparison result indicates that the summed current value Isum satisfies the selected threshold 116, and generate the configuration signal 118 based on whether the first duration satisfies a duration threshold. That is, the mode configuration circuit 112 may detect when the first comparison result 122 is set to the logic "1" value and may monitor an amount of time (e.g., the first duration) that the first comparison result 122 is set to the logic "1" value. If the first comparison result 122 is set to the logic "1" value long enough to satisfy the duration threshold, the mode configuration circuit 112 may be configured to change the configuration signal 118 from the logic "0" value to the logic "1" value in order to change the mode of the current limit controller from the non-current-limit mode to the current-limit mode. However, if the first comparison result 122 changes from the logic "1" value to the logic "0" value prior to the first duration satisfying the duration threshold, the mode configuration circuit 112 may maintain the configuration signal 118 at the logic "0" value, thereby not triggering the current-limit mode.

Accordingly, in some implementations, the first duration may satisfy the duration threshold if the first duration is greater than the duration threshold. Alternatively, in some implementations, the first duration may satisfy the duration threshold if the first duration is equal to or greater than the duration threshold. The threshold condition may be a matter of design choice. The mode configuration circuit 112 may be configured to generate the configuration signal 118 to set the current limit controller 106 in the current-limit mode if the first duration satisfies the duration threshold.

By changing the configuration signal 118 from the logic "0" value to the logic "1" value, the mode configuration circuit 112 changes a threshold value of the selected threshold 116 from the first threshold Th1 to the lower second threshold Th2. As a result, the summed current value Isum must fall below (or be equal to) the second threshold Th2 in order for the first comparator circuit 120 to be able to set the first comparison result 122 to the logic "0" value again. As long as the selected threshold 116 is set to the second threshold Th2 and the summed current value Isum satisfies the second threshold Th2, the current limit controller 106 will remain set in the current-limit mode. Therefore, the second threshold Th2 behaves like a hysteresis threshold to ensure that the summed current value Isum falls below the second threshold Th2 before the voltage regulator 100 can again operate in the non-limit current mode.

The mode configuration circuit 112 may include a time delay filter 124 (e.g., a deglitch filter) configured to monitor the first duration during which the first comparison result 122 indicates that the summed current value Isum satisfies the selected threshold 116. While the first duration satisfies the duration threshold, the time delay filter 124 may generate a current-limit mode control signal 126 that indicates that the first duration satisfies the duration threshold. The time delay filter 124 may change the current-limit mode control signal 126 to indicate when the first duration does not satisfy the duration threshold.

The mode configuration circuit 112 may include a latch 128 (e.g., a set-reset latch) that is configured to receive the current-limit mode control signal 126 and generate the configuration signal 118 to set the current limit controller 106 in the current-limit mode. For example, when the current-limit mode control signal 126 indicates that the first duration satisfies the duration threshold (e.g., the current-limit mode control signal 126 is a logic "1" value), an output of the latch 128 (e.g., the configuration signal 118) may be set to the logic "1" value, which places the current limit controller 106 into the current-limit mode.

The latch 128 may be configured to be reset based on the first comparison result 122 indicating that the summed current value Isum does not satisfy (e.g., no longer satisfies) the selected threshold 116. For example, the latch 128 may be configured to be reset when the summed current value Isum becomes less than the second threshold Th2, which is the threshold value of the selected threshold 116 when the current limit controller 106 is set in the current-limit mode (e.g., when the configuration signal 118 is set to the logic "1" value by the latch 128). Based on the latch 128 being reset, the latch 128 may be configured to generate the configuration signal 118 to set the current limit controller in the non-current-limit mode (e.g., the configuration signal 118 is set to the logic "0" value by the latch 128).

The mode configuration circuit 112 may include a logic inverter 130 and an OR logic gate 132. The OR logic gate 132 may be coupled to both the first path P1 and the second path P2, and may generate an output based on two inputs provided via the first path P1 and the second path P2. The logic inverter 130 is configured to reset the latch 128 when both inputs to the OR gate are a logic "0" value. Thus, the logic inverter 130 may reset the latch when the first comparison result 122 indicates that the summed current value Isum does not satisfy (e.g., no longer satisfies) the selected threshold 116 (e.g., when the summed current value Isum becomes less than the second threshold Th2).

The latch 128 may be configured to provide the configuration signal 118 to a programmable current limiter (not shown in FIG. 1). The programmable current limiter may be configured to receive the configuration signal 118 and a total control current (e.g., a total target current) that sets the total current of the voltage regulator 100. While the current limit controller 106 is set in the current-limit mode by the configuration signal (e.g., when the configuration signal 118 is set to the logic "1" value), the programmable current limiter may be configured to limit the total control current to a current limit value such that the total current is limited to the predefined value (e.g., the limited target value). In other words, the programmable current limiter may prevent the total current of the power stages 104 from exceeding the predefined value corresponding to the current limit value. As a result, the power stages 104 may be prevented from providing a total current that may stress the input supply of the voltage regulator 100. Moreover, the programmable current limiter may be configured to limit the total current only when a total load current amplitude exceeds a certain threshold for at least a certain duration. Thus, normal CPU activities that may cause the total load current amplitude to increase beyond a desired limit for short durations below a duration threshold may not be limited by the current limit controller 106.

In addition, the mode of the current limit controller 106 is regulated by the second monitoring path P2. The second monitoring path P2 may include a low-pass filter 134, a second comparator circuit 136, and the mode configuration circuit 112. The low-pass filter 134 may be configured to receive the summed current value Isum from the summer 110 and output a filtered current value 138. The second comparator circuit 136 (e.g., a second comparator) may be configured with a third threshold Th3 (e.g., a fixed threshold), which may be less than the first threshold Th1. In some implementations, the third threshold Th3 may be set to a value between the second threshold Th2 and the first threshold Th1. That is, the third threshold Th3 may be greater than the second threshold Th2 and less than the first threshold Th1. The second comparator circuit 136 may be configured to compare the filtered current value 138 to the third threshold Th3, and generate a second comparison result 140 that indicates whether the filtered current value 138 satisfies the third threshold Th3.

For example, the second comparator circuit 136 includes two inputs, inputs C and D, and compares the signals received at the two inputs to generate the second comparison result 140. Input C may be configured to receive the third threshold Th3 and input D may be configured to receive the filtered current value 138. The second comparator circuit 136 may be configured to compare the filtered current value 138 to the third threshold Th3 and generate the second comparison result 140 that indicates whether the filtered current value 138 satisfies the third threshold Th3. For example, the second comparison result 140 may indicate whether or not the filtered current value 138 is greater than the third threshold Th3. For example, the second comparator circuit 136 may set the second comparison result 140 to a logic "1" value when the filtered current value 138 is greater than the third threshold Th3 (e.g., when the filtered current value 138 satisfies the third threshold Th3) and the second comparator circuit 136 may set the second comparison result 140 to a logic "0" value when the filtered current value 138 is not greater than the third threshold Th3 (e.g., when the filtered current value 138 does not satisfy the third threshold Th3).

The OR logic gate 132 may be coupled to both the first path P1 and the second path P2, and may generate an output based on two inputs provided the first path P1 and the second path P2. Thus, the OR logic gate 132 may output a logic "1" value when either the first comparison result 122 or the second comparison result 140 indicates a logic "1" value, and may output a logic "0" value when both the first comparison result 122 and the second comparison result 140 indicate a logic "0" value.

The mode configuration circuit 112 may be configured to monitor a second duration during which the second comparison result 140 indicates that the filtered current value 138 satisfies the third threshold Th3, and generate the configuration signal 118 based on whether the second duration satisfies the duration threshold. That is, the mode configuration circuit 112 may detect when the second comparison result 140 is set to the logic "1" value and may monitor an amount of time (e.g., the second duration) that the second comparison result 140 is set to the logic "1" value. If the second comparison result 140 is set to the logic "1" value long enough to satisfy the duration threshold, the mode configuration circuit 112 may be configured to change the configuration signal 118 from the logic "0" value to the logic "1" value in order to change the mode of the current limit controller from the non-current-limit mode to the current-limit mode.

However, if the configuration signal 118 is at the logic "0" value and if the second comparison result 140 changes from the logic "1" value to the logic "0" value prior to the second duration satisfying the duration threshold, the mode configuration circuit 112 may maintain the configuration signal 118 at the logic "0" value, thereby not triggering the current-limit mode. Alternatively, if the configuration signal 118 is already set to the logic "1" value (e.g., due to the summed current value Isum satisfying the first threshold Th1 for the duration threshold), the mode configuration circuit 112 may maintain the configuration signal 118 at the logic "1" value until both the first comparison result 122 and the second comparison result 140 are simultaneously provided at the logic "0" value. This may occur when the summed current value Isum is less than (or equal to) the second threshold Th2 and the filtered current value 138 is less than (or equal to) the third threshold Th3.

Accordingly, in some implementations, the second duration may satisfy the duration threshold if the second duration is greater than the duration threshold. Alternatively, in some implementations, the second duration may satisfy the duration threshold if the second duration is equal to or greater than the duration threshold. The threshold condition may be a matter of design choice. The mode configuration circuit 112 may be configured to generate the configuration signal 118 to set or maintain the current limit controller 106 in the current-limit mode if the second duration satisfies the duration threshold.

Due to the OR logic gate 132 receiving both the first comparison result 122 and the second comparison result 140, the mode configuration circuit 112 may be configured to generate the configuration signal 118 to set the current limit controller 106 in the current-limit mode if the first duration satisfies the duration threshold or if the second duration satisfies the duration threshold.

By changing the configuration signal 118 from the logic "0" value to the logic "1" value, or by maintaining the configuration signal 118 at the logic "1" value, the mode configuration circuit 112 sets the current limit controller 106 into the non-current-limit mode. While in the non-current-limit mode, the selected threshold 116 is also set to the second threshold Th2. As a result, the filtered current value 138 must fall below (or be equal to) the third threshold Th3 in order for the second comparator circuit 136 to be able to set the second comparison result 140 to the logic "0" value again. As long as the filtered current value 138 satisfies the third threshold Th3, the current limit controller 106 will remain set in the current-limit mode. In order for the current limit controller 106 to return to the non-current-limit mode, the summed current value Isum must be less than (or be equal to) the second threshold Th2 and the filtered current value 138 must be less than (or be equal to) the third threshold Th3.

The time delay filter 124 (e.g., the deglitch filter) may be configured to monitor the second duration during which the second comparison result 140 indicates that the filtered current value 138 satisfies the third threshold Th3. While the second duration satisfies the duration threshold, the time delay filter 124 may generate a current-limit mode control signal 126 that indicates that the second duration satisfies the duration threshold. The time delay filter 124 may change the current-limit mode control signal 126 to indicate when the second duration does not satisfy the duration threshold.

The latch 128 (e.g., the set-reset latch) may be configured to receive the current-limit mode control signal 126 and generate the configuration signal 118 to set the current limit controller 106 in the current-limit mode. For example, when the current-limit mode control signal 126 indicates that the second duration satisfies the duration threshold (e.g., the current-limit mode control signal 126 is a logic "1" value), an output of the latch 128 (e.g., the configuration signal 118) may be set to the logic "1" value, which places the current limit controller 106 into the current-limit mode.

The latch 128 may be configured to be reset based on the second comparison result 140 indicating that the filtered current value 138 does not satisfy (e.g., no longer satisfies) the third threshold Th3, as long as the summed current value Isum also does not satisfy the second threshold Th2. For example, the latch 128 may be configured to be reset when the filtered current value 138 becomes less than the third threshold Th3, as long as the summed current value Isum also does not satisfy the second threshold Th2. Based on the latch 128 being reset, the latch 128 may be configured to generate the configuration signal 118 to set the current limit controller in the non-current-limit mode (e.g., the configuration signal 118 is set to the logic "0" value by the latch 128).

As long as the summed current value Isum also does not satisfy the second threshold Th2, the logic inverter 130 may reset the latch when the second comparison result 140 indicates that the filtered current value 138 does not satisfy (e.g., no longer satisfies) the third threshold Th3 (e.g., when the filtered current value 138 becomes less than the third threshold Th3).

The programmable current limiter may be configured to receive the configuration signal 118 and the total control current (e.g., a total target current) that sets the total current of the voltage regulator 100, and operate as described above based on the configuration signal 118.

As indicated above, FIG. 1 is provided as an example. Other examples may differ from what is described with regard to FIG. 1. The number and arrangement of devices and components shown in FIG. 1 are provided as an example. In practice, there may be additional devices or components, fewer devices or components, different devices or components, or differently arranged devices or components than those shown in FIG. 1.

Figure 2:
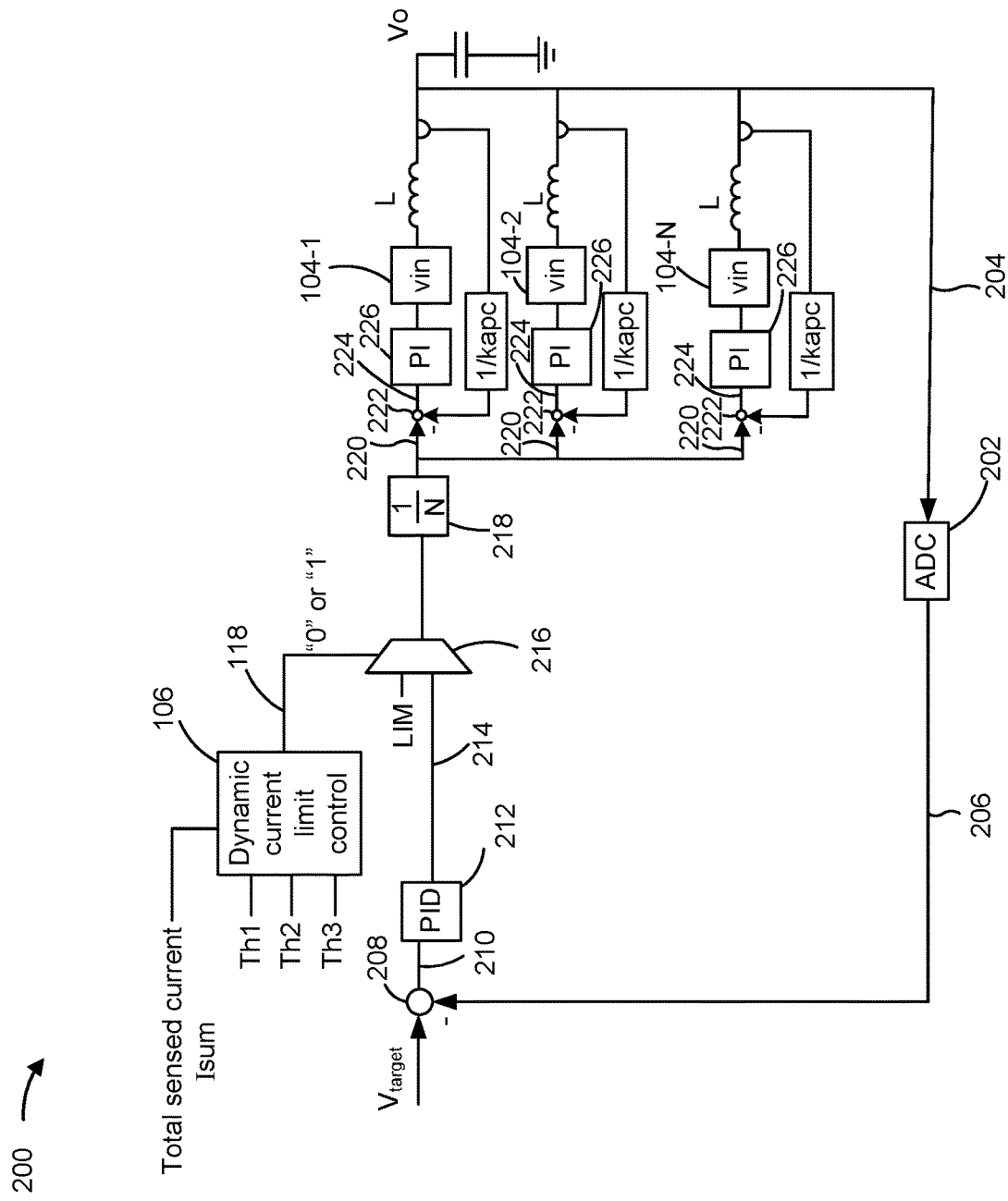
FIG. 2 shows voltage and current compensation loops of a voltage regulator according to one or more implementations.

FIG. 2 shows voltage and current compensation loops of a voltage regulator 200 according to one or more implementations. The voltage regulator 200 may be similar to the voltage regulator 100 described in connection with FIG. 1. The voltage and current compensation loops may be part of the multi-phase controller 102, which may also include the current limit controller 106.

The multi-phase controller 102 uses digital voltage and current feedback loops to maintain a tightly regulated output voltage with inherent phase current balance. During operation, the output voltage Vo may be sensed and digitized by an ADC 202 that is arranged in a voltage feedback loop 204. A digitized voltage 206 is provided to an error generator 208. The error generator 208 may also receive a target voltage $V_{target}$ for the output voltage Vo. The error generator 208 may be configured to compare the target voltage $V_{target}$ and the digitized voltage 206 and generate an error signal 210 that is representative of a difference between the target voltage $V_{target}$ and the digitized voltage 206. The error signal 210 may be provided to a digital compensator 212 (e.g., a proportional-integral-derivative (PID) controller) that uses PID parameters, such as a proportional coefficient Kp, an integral coefficient Ki, and a derivative coefficient Kd, to generate a total control current 214 (e.g., a total target current) that sets the total current of the voltage regulator 200.

The total control current 214 may be provided to a programmable current limiter 216, which may also receive the configuration signal 118. The programmable current limiter 216 may be similar to the programmable current limiter described in connection with FIG. 1. In some implementations, the programmable current limiter 216 may be part of the current limit controller 106. When the configuration signal 118 is set to a logic "0" value by the current limit controller 106, indicating the non-current-limit mode, the programmable current limiter 216 may be configured not to limit the total control current 214. Thus, the total control current 214 received by the programmable current limiter 216 passes through the programmable current limiter 216. However, if the configuration signal 118 is set to a logic "1" value by the current limit controller 106, the programmable current limiter 216 is set in the current-limit mode.

While the current limit controller 106 and the programmable current limiter 216 are set in the current-limit mode, the programmable current limiter 216 is configured to limit the total control current 214 to a current limit value LIM such that the total current of the voltage regulator 200 (e.g., of the power stages 104) is limited to a predefined value that corresponds to the current limit value LIM. The current limit value LIM may be a programmable current limit configured by programming a desired value at an input of the programmable current limiter 216 that receives the current limit value LIM. If the total control current 214 is equal to or greater than the current limit value LIM, the output of the programmable current limiter 216 may be clamped to the current limit value LIM. If the total control current 214 is less than the current limit value LIM, the output of the programmable current limiter 216 may be the same as the total control current 214.

Thus, the programmable current limiter 216 may prevent the total control current 214 from exceeding the current limit value LIM during the current-limit mode, which may prevent the total current (e.g., the total phase current of the power stages 104) from exceeding the predefined value that corresponds to the current limit value LIM. As a result, the power stages 104 may be prevented from providing a total current that may stress the input supply of the voltage regulator 100 (e.g., during abnormal activities or behavior of the load). Moreover, the programmable current limiter 216 may be configured to limit the total current only when a total load current amplitude exceeds a certain threshold for at least a certain duration. Thus, normal CPU activities that may cause the total load current amplitude to increase beyond a desired limit for short durations below a duration threshold may not be limited by the current limit controller 106.

An output of the programmable current limiter 216 (e.g., the total control current 214 or the current limit value LIM) may be provided to a divider 218 that may divide the output of the programmable current limiter 216 equally by 1/N into equal control currents 220. Thus, each active phase of the voltage regulator 200 receives a control current 220. The power stages 104 may be configured to generate their respective phase currents based on the control current 220. Each phase current may be sensed and used as feedback in an inner phase current feedback loop. Each inner phase current feedback loop may include a gain 1/kapc that may be used to convert a sensed phase current into a digital code.

Each sensed phase current (or the digital code) may be compared to the control current 220 by a respective error generator 222. Each respective error generator 222 may be configured to compare the control current 220 and a respective sensed phase current (or a respective digital code) and generate an error signal 224 that is representative of a difference between the control current 220 and the respective sensed phase current. Each error signal 224 may be provided to a respective digital compensator 226 (e.g., a proportional-integral (PI) controller) that uses PI parameters, such as a proportional coefficient Kp and an integral coefficient Ki, that is used to generate a PWM control signal for a respective power stage 104.

The current limit controller 106 enables the voltage and current compensation loops of the voltage regulator 200 to temporarily provide sufficient output current beyond current limit settings without stressing a 12V input power supply, and may limit the target current to a lower level when the current limit controller 106 enters into the current-limit mode. During the current-limit mode, the voltage regulator may perform in a constant current mode (e.g., when the output of the programmable current limiter 216 may be clamped to the current limit value LIM) and allows output voltage foldback to protect the 12V input power supply.

As indicated above, FIG. 2 is provided as an example. Other examples may differ from what is described with regard to FIG. 2. The number and arrangement of devices and components shown in FIG. 2 are provided as an example. In practice, there may be additional devices or components, fewer devices or components, different devices or components, or differently arranged devices or components than those shown in FIG. 2.

The following provides an overview of some Aspects of the present disclosure:

Aspect 1: A voltage regulator, comprising: a plurality of power stages configured to generate a plurality of phase currents, wherein a sum of the plurality of phase currents represents a total current, and wherein each power stage of the plurality of power stages is configured to generate a respective phase current of the plurality of phase currents; a summer circuit configured to sense the plurality of phase currents and generate a summed current value representative of the total current generated by the plurality of power stages; and a current limit controller configurable in a current-limit mode or a non-current-limit mode and configured to limit the total current to a predefined value during the current-limit mode, wherein the current limit controller is configured to receive the summed current value, and wherein the current limit controller comprises: a threshold selector circuit configured to select a first threshold or a second threshold as a selected threshold based on a configuration signal, wherein the second threshold is less than the first threshold, wherein, while the current limit controller is set in the non-current-limit mode, the threshold selector circuit is configured to select the first threshold as the selected threshold, and wherein, while the current limit controller is set in the current-limit mode, the threshold selector circuit is configured to select the second threshold as the selected threshold; and a first monitoring path comprising: a first comparator circuit configured with a dynamic threshold that is set to the selected threshold, wherein the first comparator circuit is configured to compare the summed current value to the selected threshold and generate a first comparison result that indicates whether the summed current value satisfies the selected threshold; and a mode configuration circuit configured to monitor a first duration during which the first comparison result indicates that the summed current value satisfies the selected threshold, and generate the configuration signal based on whether the first duration satisfies a duration threshold.

Aspect 2: The voltage regulator of Aspect 1, wherein the summed current value satisfies the selected threshold if the summed current value is greater than the selected threshold, wherein the first duration satisfies the duration threshold if the first duration is greater than the duration threshold, or the first duration satisfies the duration threshold if the first duration is equal to or greater than the duration threshold, and wherein the mode configuration circuit is configured to generate the configuration signal to set the current limit controller in the current-limit mode if the first duration satisfies the duration threshold.

Aspect 3: The voltage regulator of any of Aspects 1-2, wherein the mode configuration circuit comprises: a time delay filter configured to monitor the first duration during which the first comparison result indicates that the summed current value satisfies the selected threshold and, while the first duration satisfies the duration threshold, generate a current-limit mode control signal that indicates that the first duration satisfies the duration threshold; and a latch configured to receive the current-limit mode control signal and generate the configuration signal to set the current limit controller in the current-limit mode.

Aspect 4: The voltage regulator of Aspect 3, wherein the latch is configured to be reset based on the first comparison result indicating that the summed current value does not satisfy the selected threshold, and wherein, based on the latch being reset, the latch is configured to generate the configuration signal to set the current limit controller in the non-current-limit mode.

Aspect 5: The voltage regulator of any of Aspects 1-4, wherein the current limit controller further comprises a programmable current limiter configured to receive the configuration signal and a total control current that sets the total current of the voltage regulator, and wherein, while the current limit controller is set in the current-limit mode by the configuration signal, the programmable current limiter is configured to limit the total control current to a current limit value such that the total current is limited to the predefined value, wherein the predefined value corresponds to the current limit value.

Aspect 6: The voltage regulator of any of Aspects 1-5, wherein the current limit controller comprises: a second monitoring path comprising: a low-pass filter configured to receive the summed current value and output a filtered current value; a second comparator circuit configured with a third threshold that is less than the first threshold, wherein the second comparator circuit is configured to compare the filtered current value to the third threshold and generate a second comparison result that indicates whether the filtered current value satisfies the third threshold; and the mode configuration circuit configured to monitor a second duration during which the second comparison result indicates that the filtered current value satisfies the third threshold, and generate the configuration signal based on whether the second duration satisfies the duration threshold.

Aspect 7: The voltage regulator of Aspect 6, wherein the filtered current value satisfies the third threshold if the filtered current value is greater than the third threshold, wherein the second duration satisfies the duration threshold if the second duration is greater than the duration threshold, or the second duration satisfies the duration threshold if the second duration is equal to or greater than the duration threshold, and wherein the mode configuration circuit is configured to generate the configuration signal to set the current limit controller in the current-limit mode if the second duration satisfies the duration threshold.

Aspect 8: The voltage regulator of Aspect 6, wherein the mode configuration circuit comprises: a time delay filter configured to monitor the second duration during which the second comparison result indicates that the filtered current value satisfies the third threshold and, while the second duration satisfies the duration threshold, generate a current-limit mode control signal that indicates that the second duration satisfies the duration threshold; and a latch configured to receive the current-limit mode control signal and generate the configuration signal to set the current limit controller in the current-limit mode.

Aspect 9: The voltage regulator of Aspect 8, wherein the latch is configured to be reset based on the second comparison result indicating that the filtered current value does not satisfy the third threshold, and wherein, based on the latch being reset, the latch is configured to generate the configuration signal to set the current limit controller in the non-current-limit mode.

Aspect 10: The voltage regulator of Aspect 6, wherein the current limit controller further comprises a programmable current limiter configured to receive the configuration signal and a total control current that sets the total current of the voltage regulator, and wherein, while the current limit controller is set in the current-limit mode by the configuration signal, the programmable current limiter is configured to limit the total control current to a current limit value such that the total current is limited to the predefined value, wherein the predefined value corresponds to the current limit value.

Aspect 11: The voltage regulator of Aspect 6, wherein the third threshold is greater than the second threshold.

Aspect 12: The voltage regulator of Aspect 6, wherein the current limit controller comprises an OR logic gate that is coupled to the first monitoring path for receiving the first comparison result and to the second monitoring path for receiving the second comparison result, wherein an output of the OR logic gate is coupled to an input of the mode configuration circuit.

Aspect 13: The voltage regulator of Aspect 6, wherein the summed current value satisfies the selected threshold if the summed current value is greater than the selected threshold, wherein the first duration satisfies the duration threshold if the first duration is greater than the duration threshold, or the first duration satisfies the duration threshold if the first duration is equal to or greater than the duration threshold, wherein the filtered current value satisfies the third threshold if the filtered current value is greater than the third threshold, wherein the second duration satisfies the duration threshold if the second duration is greater than the duration threshold, or the second duration satisfies the duration threshold if the second duration is equal to or greater than the duration threshold, and wherein the mode configuration circuit is configured to generate the configuration signal to set the current limit controller in the current-limit mode if the first duration satisfies the duration threshold or if the second duration satisfies the duration threshold.

Aspect 14: The voltage regulator of Aspect 13, wherein the current limit controller further comprises a programmable current limiter configured to receive the configuration signal and a total control current that sets the total current of the voltage regulator, and wherein, while the current limit controller is set in the current-limit mode by the configuration signal, the programmable current limiter is configured to limit the total control current to a current limit value such that the total current is limited to the predefined value, wherein the predefined value corresponds to the current limit value.

Aspect 15: The voltage regulator of any of Aspects 1-14, wherein each power stage of the plurality of power stages includes a respective gate driver and a respective transistor half-bridge configured to be driven by the respective gate driver to generate the respective phase current.

Aspect 16: A multi-phase controller, comprising: a summer circuit configured to sense a plurality of phase currents generated by a plurality of power stages and generate a summed current value representative of a total current generated by the plurality of power stages; and a current limit controller configurable in a current-limit mode or a non-current-limit mode and configured to limit the total current to a predefined value during the current-limit mode, wherein the current limit controller is configured to receive the summed current value, and wherein the current limit controller comprises: a threshold selector circuit configured to select a first threshold or a second threshold as a selected threshold based on a configuration signal, wherein the second threshold is less than the first threshold, wherein, while the current limit controller is set in the non-current-limit mode, the threshold selector circuit is configured to select the first threshold as the selected threshold, and wherein, while the current limit controller is set in the current-limit mode, the threshold selector circuit is configured to select the second threshold as the selected threshold; and a first monitoring path comprising: a first comparator circuit configured with a dynamic threshold that is set to the selected threshold, wherein the first comparator circuit is configured to compare the summed current value to the selected threshold and generate a first comparison result that indicates whether the summed current value satisfies the selected threshold; and a mode configuration circuit configured to monitor a first duration during which the first comparison result indicates that the summed current value satisfies the selected threshold, and generate the configuration signal based on whether the first duration satisfies a duration threshold.

Aspect 17: The multi-phase controller of Aspect 16, wherein the summed current value satisfies the selected threshold if the summed current value is greater than the selected threshold, wherein the first duration satisfies the duration threshold if the first duration is greater than the duration threshold or the first duration satisfies the duration threshold if the first duration is equal to or greater than the duration threshold, and wherein the mode configuration circuit is configured to generate the configuration signal to set the current limit controller in the current-limit mode if the first duration satisfies the duration threshold.

Aspect 18: The multi-phase controller of any of Aspects 16-17, wherein the current limit controller comprises: a second monitoring path comprising: a low-pass filter configured to receive the summed current value and output a filtered current value; a second comparator circuit configured with a third threshold that is less than the first threshold, wherein the second comparator circuit is configured to compare the filtered current value to the third threshold and generate a second comparison result that indicates whether the filtered current value satisfies the third threshold; and the mode configuration circuit configured to monitor a second duration during which the second comparison result indicates that the filtered current value satisfies the third threshold, and generate the configuration signal based on whether the second duration satisfies the duration threshold.

Aspect 19: The multi-phase controller of Aspect 18, wherein the filtered current value satisfies the third threshold if the filtered current value is greater than the third threshold, wherein the second duration satisfies the duration threshold if the second duration is greater than the duration threshold, or the second duration satisfies the duration threshold if the second duration is equal to or greater than the duration threshold, and wherein the mode configuration circuit is configured to generate the configuration signal to set the current limit controller in the current-limit mode if the second duration satisfies the duration threshold.

Aspect 20: A method of limiting a total phase current generated a plurality of power stages, the method comprising: sensing a plurality of phase currents generated by the plurality of power stages; generating a summed current value representative of the total phase current of the plurality of phase currents; configuring a current limit controller in a current-limit mode or a non-current-limit mode, wherein the current limit controller is configured to limit the total phase current to a predefined value during the current-limit mode; selecting a first threshold or a second threshold as a selected threshold based on a configuration signal, wherein the second threshold is less than the first threshold, wherein, while the current limit controller is set in the non-current-limit mode, the first threshold is used as the selected threshold, and wherein, while the current limit controller is set in the current-limit mode, the second threshold is used as the selected threshold; comparing the summed current value to the selected threshold; generating a first comparison result that indicates whether the summed current value satisfies the selected threshold; monitoring a first duration during which the first comparison result indicates that the summed current value satisfies the selected threshold; and generating the configuration signal based on whether the first duration satisfies a duration threshold.

Aspect 21: The method of Aspect 20, further comprising: low-pass filtering the summed current value to generate a filtered current value; comparing the filtered current value to a third threshold that is less than the first threshold; generating a second comparison result that indicates whether the filtered current value satisfies the third threshold; monitoring a second duration during which the second comparison result indicates that the filtered current value satisfies the third threshold; and generating the configuration signal based on whether the second duration satisfies the duration threshold.

Aspect 22: A system configured to perform one or more operations recited in one or more of Aspects 1-21.

Aspect 23: An apparatus comprising means for performing one or more operations recited in one or more of Aspects 1-21.

Aspect 24: A non-transitory computer-readable medium storing a set of instructions, the set of instructions comprising one or more instructions that, when executed by a device, cause the device to perform one or more operations recited in one or more of Aspects 1-21.

Aspect 25: A computer program product comprising instructions or code for executing one or more operations recited in one or more of Aspects 1-21.

The foregoing disclosure provides illustration and description, but is not intended to be exhaustive or to limit the implementations to the precise form disclosed. Modifications and variations may be made in light of the above disclosure or may be acquired from practice of the implementations.

Some implementations may be described herein in connection with thresholds. As used herein, "satisfying" a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term "component" is intended to be broadly construed as hardware, firmware, or a combination of hardware and software. Systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein, refers to any of the foregoing structures or any other structure suitable for implementation of the techniques described herein. Software may be stored on a non-transitory computer-readable medium such that the non-transitory computer readable medium includes program code or a program algorithm stored thereon that, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal, further information. "Signal conditioning," as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a and b, a and c, b and c, and a, b, and c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A voltage regulator, comprising:
    a plurality of power stages configured to generate a plurality of phase currents, wherein a sum of the plurality of phase currents represents a total current, and wherein each power stage of the plurality of power stages is configured to generate a respective phase current of the plurality of phase currents;
    a summer circuit configured to sense the plurality of phase currents and generate a summed current value representative of the total current generated by the plurality of power stages; and
    a current limit controller configurable in a current-limit mode or a non-current-limit mode and configured to limit the total current to a predefined value during the current-limit mode, wherein the current limit controller is configured to receive the summed current value, and wherein the current limit controller comprises:
        a threshold selector circuit configured to select a first threshold or a second threshold as a selected threshold based on a configuration signal,
            wherein the second threshold is less than the first threshold,
            wherein, while the current limit controller is set in the non-current-limit mode, the threshold selector circuit is configured to select the first threshold as the selected threshold, and
            wherein, while the current limit controller is set in the current-limit mode, the threshold selector circuit is configured to select the second threshold as the selected threshold; and
        a first monitoring path comprising:
            a first comparator circuit configured with a dynamic threshold that is set to the selected threshold, wherein the first comparator circuit is configured to compare the summed current value to the selected threshold and generate a first comparison result that indicates whether the summed current value satisfies the selected threshold; and
            a mode configuration circuit configured to monitor a first duration during which the first comparison result indicates that the summed current value satisfies the selected threshold, and generate the configuration signal based on whether the first duration satisfies a duration threshold.

2. The voltage regulator of claim 1, wherein the summed current value satisfies the selected threshold if the summed current value is greater than the selected threshold,
    wherein the first duration satisfies the duration threshold if the first duration is greater than the duration threshold, or the first duration satisfies the duration threshold if the first duration is equal to or greater than the duration threshold, and wherein the mode configuration circuit is configured to generate the configuration signal to set the current limit controller in the current-limit mode if the first duration satisfies the duration threshold.

3. The voltage regulator of claim 1, wherein the mode configuration circuit comprises:
 a time delay filter configured to monitor the first duration during which the first comparison result indicates that the summed current value satisfies the selected threshold and, while the first duration satisfies the duration threshold, generate a current-limit mode control signal that indicates that the first duration satisfies the duration threshold; and
 a latch configured to receive the current-limit mode control signal and generate the configuration signal to set the current limit controller in the current-limit mode.

4. The voltage regulator of claim 3, wherein the latch is configured to be reset based on the first comparison result indicating that the summed current value does not satisfy the selected threshold, and
 wherein, based on the latch being reset, the latch is configured to generate the configuration signal to set the current limit controller in the non-current-limit mode.

5. The voltage regulator of claim 1, wherein the current limit controller further comprises a programmable current limiter configured to receive the configuration signal and a total control current that sets the total current of the voltage regulator, and
 wherein, while the current limit controller is set in the current-limit mode by the configuration signal, the programmable current limiter is configured to limit the total control current to a current limit value such that the total current is limited to the predefined value, wherein the predefined value corresponds to the current limit value.

6. The voltage regulator of claim 1, wherein the current limit controller comprises:
 a second monitoring path comprising:
  a low-pass filter configured to receive the summed current value and output a filtered current value;
  a second comparator circuit configured with a third threshold that is less than the first threshold, wherein the second comparator circuit is configured to compare the filtered current value to the third threshold and generate a second comparison result that indicates whether the filtered current value satisfies the third threshold; and
  the mode configuration circuit configured to monitor a second duration during which the second comparison result indicates that the filtered current value satisfies the third threshold, and generate the configuration signal based on whether the second duration satisfies the duration threshold.

7. The voltage regulator of claim 6, wherein the filtered current value satisfies the third threshold if the filtered current value is greater than the third threshold,
 wherein the second duration satisfies the duration threshold if the second duration is greater than the duration threshold, or the second duration satisfies the duration threshold if the second duration is equal to or greater than the duration threshold, and
 wherein the mode configuration circuit is configured to generate the configuration signal to set the current limit controller in the current-limit mode if the second duration satisfies the duration threshold.

8. The voltage regulator of claim 6, wherein the mode configuration circuit comprises:
 a time delay filter configured to monitor the second duration during which the second comparison result indicates that the filtered current value satisfies the third threshold and, while the second duration satisfies the duration threshold, generate a current-limit mode control signal that indicates that the second duration satisfies the duration threshold; and
 a latch configured to receive the current-limit mode control signal and generate the configuration signal to set the current limit controller in the current-limit mode.

9. The voltage regulator of claim 8, wherein the latch is configured to be reset based on the second comparison result indicating that the filtered current value does not satisfy the third threshold, and
 wherein, based on the latch being reset, the latch is configured to generate the configuration signal to set the current limit controller in the non-current-limit mode.

10. The voltage regulator of claim 6, wherein the current limit controller further comprises a programmable current limiter configured to receive the configuration signal and a total control current that sets the total current of the voltage regulator, and
 wherein, while the current limit controller is set in the current-limit mode by the configuration signal, the programmable current limiter is configured to limit the total control current to a current limit value such that the total current is limited to the predefined value, wherein the predefined value corresponds to the current limit value.

11. The voltage regulator of claim 6, wherein the third threshold is greater than the second threshold.

12. The voltage regulator of claim 6, wherein the current limit controller comprises an OR logic gate that is coupled to the first monitoring path for receiving the first comparison result and to the second monitoring path for receiving the second comparison result, wherein an output of the OR logic gate is coupled to an input of the mode configuration circuit.

13. The voltage regulator of claim 6, wherein the summed current value satisfies the selected threshold if the summed current value is greater than the selected threshold,
 wherein the first duration satisfies the duration threshold if the first duration is greater than the duration threshold, or the first duration satisfies the duration threshold if the first duration is equal to or greater than the duration threshold,
 wherein the filtered current value satisfies the third threshold if the filtered current value is greater than the third threshold,
 wherein the second duration satisfies the duration threshold if the second duration is greater than the duration threshold, or the second duration satisfies the duration threshold if the second duration is equal to or greater than the duration threshold, and
 wherein the mode configuration circuit is configured to generate the configuration signal to set the current limit controller in the current-limit mode if the first duration satisfies the duration threshold or if the second duration satisfies the duration threshold.

14. The voltage regulator of claim 13, wherein the current limit controller further comprises a programmable current limiter configured to receive the configuration signal and a total control current that sets the total current of the voltage regulator, and wherein, while the current limit controller is set in the current-limit mode by the configuration signal, the programmable current limiter is configured to limit the total control current to a current limit value such that the total current is limited to the predefined value, wherein the predefined value corresponds to the current limit value.

15. The voltage regulator of claim 1, wherein each power stage of the plurality of power stages includes a respective gate driver and a respective transistor half-bridge configured to be driven by the respective gate driver to generate the respective phase current.

16. A multi-phase controller, comprising:
a summer circuit configured to sense a plurality of phase currents generated by a plurality of power stages and generate a summed current value representative of a total current generated by the plurality of power stages; and
a current limit controller configurable in a current-limit mode or a non-current-limit mode and configured to limit the total current to a predefined value during the current-limit mode, wherein the current limit controller is configured to receive the summed current value, and wherein the current limit controller comprises:
a threshold selector circuit configured to select a first threshold or a second threshold as a selected threshold based on a configuration signal,
wherein the second threshold is less than the first threshold,
wherein, while the current limit controller is set in the non-current-limit mode, the threshold selector circuit is configured to select the first threshold as the selected threshold, and
wherein, while the current limit controller is set in the current-limit mode, the threshold selector circuit is configured to select the second threshold as the selected threshold; and
a first monitoring path comprising:
a first comparator circuit configured with a dynamic threshold that is set to the selected threshold, wherein the first comparator circuit is configured to compare the summed current value to the selected threshold and generate a first comparison result that indicates whether the summed current value satisfies the selected threshold; and
a mode configuration circuit configured to monitor a first duration during which the first comparison result indicates that the summed current value satisfies the selected threshold, and generate the configuration signal based on whether the first duration satisfies a duration threshold.

17. The multi-phase controller of claim 16, wherein the summed current value satisfies the selected threshold if the summed current value is greater than the selected threshold, wherein the first duration satisfies the duration threshold if the first duration is greater than the duration threshold or the first duration satisfies the duration threshold if the first duration is equal to or greater than the duration threshold, and
wherein the mode configuration circuit is configured to generate the configuration signal to set the current limit controller in the current-limit mode if the first duration satisfies the duration threshold.

18. The multi-phase controller of claim 16, wherein the current limit controller comprises:
a second monitoring path comprising:
a low-pass filter configured to receive the summed current value and output a filtered current value;
a second comparator circuit configured with a third threshold that is less than the first threshold, wherein the second comparator circuit is configured to compare the filtered current value to the third threshold and generate a second comparison result that indicates whether the filtered current value satisfies the third threshold; and
the mode configuration circuit configured to monitor a second duration during which the second comparison result indicates that the filtered current value satisfies the third threshold, and generate the configuration signal based on whether the second duration satisfies the duration threshold.

19. The multi-phase controller of claim 18, wherein the filtered current value satisfies the third threshold if the filtered current value is greater than the third threshold,
wherein the second duration satisfies the duration threshold if the second duration is greater than the duration threshold, or the second duration satisfies the duration threshold if the second duration is equal to or greater than the duration threshold, and
wherein the mode configuration circuit is configured to generate the configuration signal to set the current limit controller in the current-limit mode if the second duration satisfies the duration threshold.

20. A method of limiting a total phase current generated a plurality of power stages, the method comprising:
sensing a plurality of phase currents generated by the plurality of power stages;
generating a summed current value representative of the total phase current of the plurality of phase currents;
configuring a current limit controller in a current-limit mode or a non-current-limit mode,
wherein the current limit controller is configured to limit the total phase current to a predefined value during the current-limit mode;
selecting a first threshold or a second threshold as a selected threshold based on a configuration signal,
wherein the second threshold is less than the first threshold,
wherein, while the current limit controller is set in the non-current-limit mode, the first threshold is used as the selected threshold, and
wherein, while the current limit controller is set in the current-limit mode, the second threshold is used as the selected threshold;
comparing the summed current value to the selected threshold;
generating a first comparison result that indicates whether the summed current value satisfies the selected threshold;
monitoring a first duration during which the first comparison result indicates that the summed current value satisfies the selected threshold; and
generating the configuration signal based on whether the first duration satisfies a duration threshold.

21. The method of claim 20, further comprising:
low-pass filtering the summed current value to generate a filtered current value;

comparing the filtered current value to a third threshold that is less than the first threshold;
generating a second comparison result that indicates whether the filtered current value satisfies the third threshold;
monitoring a second duration during which the second comparison result indicates that the filtered current value satisfies the third threshold; and
generating the configuration signal based on whether the second duration satisfies the duration threshold.

\* \* \* \* \*